Oct. 22, 1957 R. A. RUSSELL 2,810,416
DEVICE FOR HALVING ENGLISH MUFFINS
Filed May 4, 1956
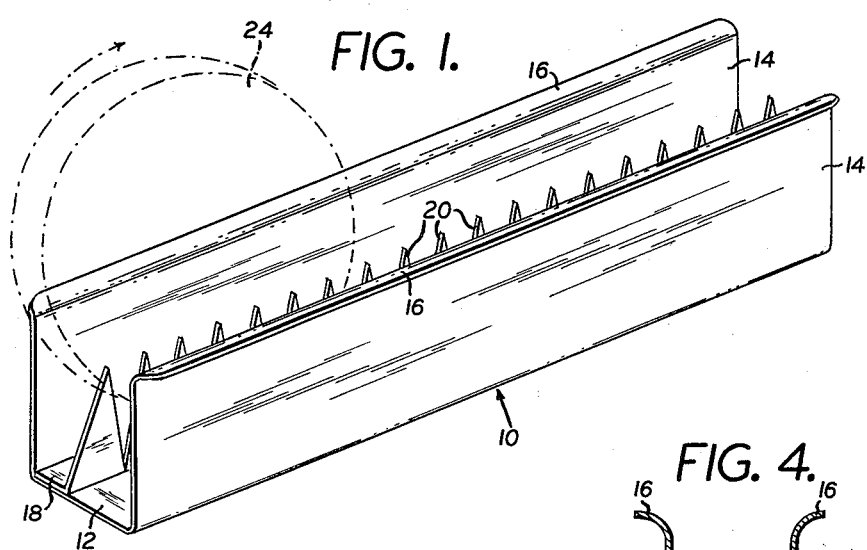
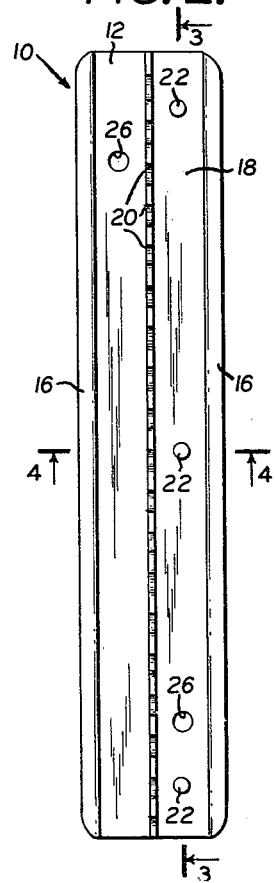
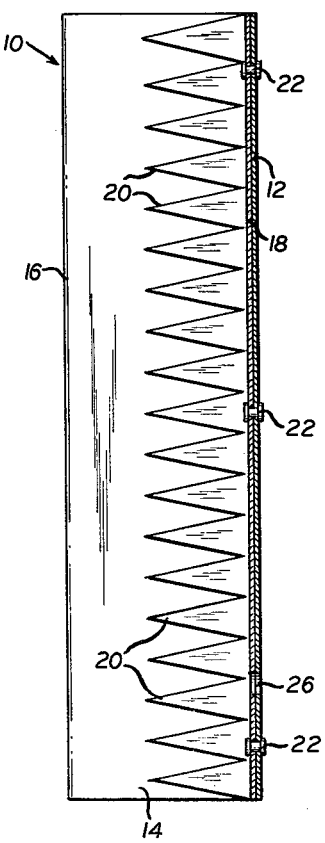
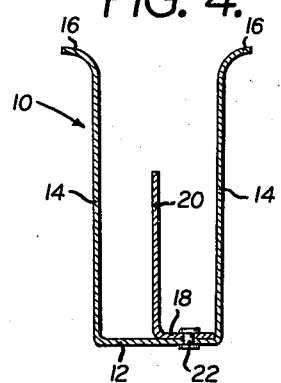
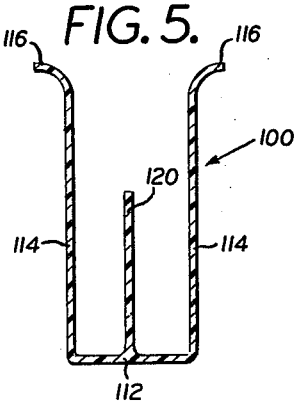
INVENTOR
RICHARD A. RUSSELL.
BY
ATTORNEYS.

United States Patent Office 2,810,416
Patented Oct. 22, 1957

2,810,416

DEVICE FOR HALVING ENGLISH MUFFINS

Richard A. Russell, Scarsdale, N. Y.

Application May 4, 1956, Serial No. 582,814

7 Claims. (Cl. 146—72)

The invention relates to an apparatus for and method of splitting or halving English muffins and/or crumpets.

To those conversant with the art of commercial manufacture of English muffins or crumpets, it will be remembered that the same are only partially baked when they are packed and shipped from the baker to the retail store and/or restaurant. The remainder of the cooking is done by the ultimate consumer immediately prior to eating, by baking or toasting in either a toaster, broiler, or other suitable device.

For the very best results in taste and appearance English muffins should be torn in half and baked or toasted in this condition. It is recognized custom that to effect the proper tearing and halving operation, they be gently torn or pulled apart into halves. This results in a rough surface texture, so that when the halves are evenly cooked and toasted to a crisp brown, the result is a most attractive appearance and the best taste possible. Also the porous surface holds the butter or other spread which is usually applied. For these reasons, English muffins should never be cut in half with a knife, for if smoothly cut in half by a knife, the surfaces so separated become compressed into heavy, doughly masses which are unpalatable, unattractive do not brown or toast properly.

To halve English muffins in order to provide the desired rough texture, it has been the practice to use one or two kitchen forks as tools. The fork tines are usually stabbed into the peripheral wall of the muffin or crumpet along the complete circumference thereof, and during each stabbing, twisting repeatedly to form a rough opening. When the halves of the English muffins are then torn apart, they leave the desired roughened surfaces. It will be readily obvious that this method requires considerable time and effort, and could not in general be practiced at home, and definitely not in restaurants or other eating places where English muffins are served in great quantities.

It is an object of this invention to provide an easier and faster method of halving English muffins, and a simple, economically practical device for accomplishing the method.

Features of the apparatus of the invention reside in its simplicity of structure, its safety and cleanliness, and because it requires no moving parts, its long life and ability to be constructed of a variety of materials such as stainless steel, aluminum, copper or molded plastics. It may be equally applicable for use in public eating places as well as in private homes. No maintenance is required to keep the device ready for operation. Moreover, as a result of features of the construction, the production of crumbs during the halving operation is almost entirely eliminated.

Because English muffins are made from a raised dough, they are not always uniform in thickness. Therefore, when the halves are separated, they generally vary in thickness. This results in an interference with portion control which is extremely important to restaurateurs, and also makes it difficult for toasting in automatic toasters, since one side is ordinarily too thick and jams in the toaster. It is another object of the invention to provide a device that will define the English muffin into two substantially equal halves.

Other and further objects of my invention reside in the structures and arrangements hereinafter more fully described with reference to the accompanying drawings in which:

Fig. 1 is a perspective view of a device for splitting or halving English muffins or crumpets in accordance with the teaching of the invention.

Fig. 2 is a top view of the device shown in Fig. 1.

Fig. 3 is a sectional view of the device shown in Figs. 1 and 2 as taken along lines 3—3 of Fig. 2.

Fig. 4 is an end view of the device shown in Fig. 1.

Fig. 5 is an end view of a modified device for splitting or halving English muffins or crumpets in accordance with the teaching of the invention.

Referring now to Figs. 1 to 4 inclusive of the drawings, the embodiment of the invention there shown is generally identified by the numeral 10. The device 10 employed for splitting or halving English muffins or crumpets is generally U-shaped, having a trough-like opening formed therein. The device 10 comprises a base 12 of elongated length having side walls 14 extending upwardly from the sides thereof and integrally therewith.

The walls 14 shown in the drawings are substantially normal to the base 12, however, as the description proceeds, it will be clear that the same may be slightly tapered outwardly to converge toward the base 12. The tops of each of the side walls 14 are curved to flare outwardly as at 16, to form therebetween a guideway for an English muffin or crumpet that is to be rolled within the U-shaped or trough-like member formed by the walls 14 and the integral base 12.

The walls 14 are also elongated in length and extend for the full distance of the base 12. Although it is mentioned that the walls 14 may be tapered to converge toward the integral base 12, in the drawings and in actual use, the taper is so slight that it can be said that the walls are in parallel relationship to each other.

Situated within the trough of the U-shaped member, is a toothed member 18, the base of which is adapted to seat on the base 12 so that its teeth 20 project upwardly from the base perpendicularly thereto and in parallelism to the parallel walls 14. The teeth 20 are formed on the member 18 to define a line which extends for the full length of the base 12, the line of teeth being spaced midway between the trough formed by the two walls 14 thus dividing the trough longitudinally in half. This line of teeth is secured at its base member 18 to the base 12 by rivets 22 or any other suitable securing means so that it is made an integral part of the U-shaped trough-like member.

The teeth 20 are in the form of inverted V's, the walls of which are tapered downwardly from an apex or point that is adapted to penetrate into the peripheral wall of an English muffin or crumpet 24 shown in dot-dash lines in Fig. 1 when the same is rolled in the trough-like member between the guideway formed by the upstanding walls 14 and the outwardly curved ends 16. Each of the teeth 20 is equally spaced one from the other, and the number of teeth is such that the last tooth that will penetrate into the peripheral wall of the English muffin will be next to the penetration made by the first tooth in the line of teeth 20 when the same is rolled in the trough-like member over the teeth 20.

Defined in the base 12 of the trough-like member are a plurality of openings 26 through which may pass screws or nails so that the device 10 may be affixed to a wall in a vertical position, or to a working board horizontally, or to any other desired surface. On the other hand, if it is so desired, the same may be used unmounted, and kept in a drawer as any other kitchen utensil.

In operation, one of the ends of the device 10 will be employed as an entrance, while the other end will constitute an exit for the rolling English muffin. By standing an English muffin upon its end or peripheral wall as shown in Fig. 1, it is rolled into the entrance of the trough-like member onto the base 12, guided between the upright walls 14, through the entrance and over the line of teeth 20. As it is rolled in the guideway formed by the trough, the teeth 20 penetrate the peripheral wall of the English muffin and enter thereinto, thereby roughly severing the same along a vertical plane thereof.

As the English muffin is rolled from the entrance into the device 10 toward and out through the exit thereof, the tooth member 18 being of such length as to be equal to the circumference of the English muffin, the last tooth 20 thereof will penetrate into the English muffin next to the penetration that was made by the first tooth at the entrance of the device. The continuous penetrations made by the teeth 20 into the rolling English muffin define a vertical plane in the same that is midway between the two sides of the muffin, hence, defining the same into two halves.

It will be recognized that the teeth 20 are substantially shorter than the walls 14, and that they do not penetrate to the center of the English muffin. The short height of the teeth as compared to the walls 14 provides a safety factor in that the person rolling the muffin will not have his fingers caught and cut on the teeth. Additionally, because the teeth do not penetrate into the muffin to the center thereof, it is necessary, after the vertical plane is defined by the teeth, that the two defined halves of the muffin be separated by gently tearing the same apart. Hence, when the two halves of the muffin are separated or torn apart, they will leave a similar roughened surface at the portion of the halves that were left unperforated by the teeth.

Having the teeth 20 short enough so they do not penetrate to the center of the muffin is of advantage where muffins are split, or prepared for toasting in quantity and in advance. The unperforated area in the center holds the halves together until ready for toasting. This helps to keep the halves from drying out while standing. For home use the teeth of the device can be higher thereby reaching the center of the muffin and allowing the halves to be completely severed.

From the foregoing it will be clear that the invention provides a very simple device for quickly and efficiently defining two halves of an English muffin or crumpet along a vertical plane and so perforating the peripheral wall of the muffin in a rapid, efficient manner as to permit the two halves to be separated such that the separating surfaces leave the desired roughened texture to provide the desired appearance and taste when they are further cooked or toasted.

Referring now to the device 100 shown in Fig. 5, it will be recognized that the structure there disclosed is substantially the same as that previously described in the device 10 supra, except however, that the line of teeth 120 thereof forming the line of teeth is molded integrally with the base 112 and the walls 114. This construction results in a one-piece, integrally molded unit.

Openings similar to the openings 26 defined in the base 12 may also be provided in the instant embodiment 100 to enable the same to be secured to any surface if desired.

It will be readily recognized that the instant invention is readily adaptable for use in bakeries to be employed in conjunction with automatic baking and processing machines. In such instances the English muffins or crumpets may be conveyed directly to and mechanically rolled through the halving device. Since halving of the English muffins need not be complete the two halves need not fall apart from each other. The unperforated dough in the center holds the halves together to minimize drying out in shipment or in storage. This is of importance because bakeries produce in such mass quantities that after the halves of the English muffin are defined it can then be frozen pending future shipment.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

What is claimed is:

1. A device for halving an English muffin or crumpet comprising a trough member extending for the full length of the circumference of the muffin to be halved, a pair of parallel walls extending upwardly along the sides of said trough member to form a trough therein and between which the muffin may be rolled, said walls being curved downwardly at the tops thereof to define a guideway for the rolling muffin, a line of inverted equally spaced V-shaped teeth in parallel relationship with and between said parallel walls and being of less height than said walls and in the trough therebetween, said line of teeth extending for the full length of said trough and each tooth being spaced equally one from the other to penetrate the peripheral wall of the rolling muffin for the full circumference thereof with the last tooth in the line penetrating the peripheral wall next to the penetration made by the first tooth in said line, the penetrations defining a vertical plane through said muffin to define two equal halves thereof.

2. A device for halving an English muffin or crumpet as in claim 1, said line of teeth being formed on a member, said last named member being secured integrally to the base of said trough member.

3. A device for halving an English muffin or crumpet as in claim 2, and openings defined in the base of said trough member to enable the same to be secured to a surface.

4. A device for halving an English muffin or crumpet as in claim 1, said line of teeth being formed on a member, said toothed member and walls being molded integrally with said trough member.

5. A device to aid in dividing an English muffin or crumpet in half comprising a U-shaped elongated member, the walls of said member extending upwardly and flaring outwardly at the ends thereof to define a guideway for the muffin rolled therein, said U-shaped member having an entrance at one end thereof and an exit at the other end thereof, an upright toothed member projecting upwardly from the base of said U-shaped member between said walls for a height less than said walls, said walls and toothed member being in parallelism to the said teeth of said toothed member penetrating the muffin as the same is rolled along in said guideway from the entrance thereof and out of the same through the exit thereof, said tooth member being equal in length to the circumference of the English muffin whereby the penetrations of said teeth define two halves of the muffin.

6. A device as in claim 5, said toothed member being secured to the base of said U-shaped member to form an integral part thereof.

7. A device as in claim 5, said toothed member being molded integrally with said U-shaped member.

References Cited in the file of this patent

UNITED STATES PATENTS

| | | |
|---|---|---|
| 1,351,088 | Vaudreuil | Aug. 31, 1920 |
| 1,747,461 | Vaughan | Feb. 18, 1930 |
| 2,109,859 | Cope | Mar. 1, 1938 |
| 2,669,269 | Schmidt | Feb. 16, 1954 |
| 2,735,466 | Krstinich | Feb. 21, 1956 |
| 2,738,817 | Wadoz | Mar. 20, 1956 |